United States Patent
Kasashima et al.

(10) Patent No.: US 12,524,311 B2
(45) Date of Patent: Jan. 13, 2026

(54) ELECTRONIC CONTROL UNIT AND STORAGE MEDIUM STORING SOFTWARE REDUNDANCY ESTABLISHING PROGRAM

(71) Applicant: DENSO CORPORATION, Kariya (JP)

(72) Inventors: Tatsuya Kasashima, Kariya (JP); Kazuki Kashiwabara, Kariya (JP)

(73) Assignee: DENSO CORPORATION, Kariya (JP)

( * ) Notice: Subject to any disclaimer, the term of this patent is extended or adjusted under 35 U.S.C. 154(b) by 22 days.

(21) Appl. No.: 18/603,534

(22) Filed: Mar. 13, 2024

(65) Prior Publication Data
US 2024/0311247 A1 Sep. 19, 2024

(30) Foreign Application Priority Data
Mar. 17, 2023 (JP) ................. 2023-043056

(51) Int. Cl.
G06F 11/14 (2006.01)
G06F 8/65 (2018.01)

(52) U.S. Cl.
CPC ............ *G06F 11/1433* (2013.01); *G06F 8/65* (2013.01)

(58) Field of Classification Search
CPC .............................. G06F 11/1433; G06F 8/65
See application file for complete search history.

(56) References Cited

U.S. PATENT DOCUMENTS

2022/0091762 A1* 3/2022 Tatsumi ................ G06F 3/0659

FOREIGN PATENT DOCUMENTS

JP 2016-143103 A 8/2016

* cited by examiner

*Primary Examiner* — Bryce P Bonzo
*Assistant Examiner* — Audrey Emma Whitesell
(74) *Attorney, Agent, or Firm* — Harness, Dickey & Pierce, P.L.C.

(57) ABSTRACT

An electronic control unit includes a controller configured to set one of a first storage section and a second storage section as an active area, and set another one of the first storage section and the second storage section as an inactive area. The controller rewrites the software in the inactive area into software identical to the software in the active area in a case where a predetermined condition is satisfied.

14 Claims, 7 Drawing Sheets

ELECTRONIC CONTROL UNIT AND STORAGE MEDIUM STORING SOFTWARE REDUNDANCY ESTABLISHING PROGRAM

CROSS REFERENCE TO RELATED APPLICATION

This application is based on Japanese Patent Application No. 2023-043056 filed on Mar. 17, 2023, the disclosure of which is incorporated herein by reference.

TECHNICAL FIELD

The present disclosure relates to an electronic control unit and a software redundancy establishing program.

BACKGROUND

A related art discloses a configuration using a dual-system control unit in which a main processing unit and a sub-processing unit are used. In a related art, when software in the main processing unit is rewritten, a program for rewriting the software is backed up in advance in a storage area of the sub-processing unit. Then, when the rewriting of the software in the main processing unit fails, the software is restored by the program backed up in the sub-processing unit.

SUMMARY

An electronic control unit includes a controller configured to set one of a first storage section and a second storage section as an active area, and set another one of the first storage section and the second storage section as an inactive area. The controller rewrites the software in the inactive area into software identical to the software in the active area in a case where a predetermined condition is satisfied.

BRIEF DESCRIPTION OF DRAWINGS

Objects, features and advantages of the present disclosure will become more apparent from the following detailed description made with reference to the accompanying drawings. In the drawings.

DETAILED DESCRIPTION

As an in-vehicle electronic control unit (ECU) mounted in a vehicle, there is provided a configuration in which a storage area is divided into two or more areas, and in which, in a case where, for example, a bank A is set as an active bank and a bank B is set as an inactive bank, software in the bank B can be rewritten while software in the bank A is being executed. Each storage area may be referred to as a memory bank or a bank. The two-bank storage areas may be referred to as dual banks.

The inventors of the present application have found the following. An assumption can be made that a failure may propagate into a storage area due to occurrence of an abnormality in rewritten software. From the viewpoint of ensuring safety, to cope with the case in which an abnormality occurs in software, safety is required to be ensured in the system by promptly restoring the software.

In the technique of a related art, preparation is required in advance in the sub-processing unit as to the storage area for allowing the program for rewriting the software in the main processing unit to be backed up. Resources may not be effectively utilized in the configuration where the storage area is prepared to store the program of the limited use for rewriting the software in the main processing unit. The safety of the system may not be seamlessly ensured in the configuration where the backup is performed to prepare merely for when the software in the main processing unit is rewritten.

The present disclosure provides an electronic control unit, a software redundancy establishing program, a storage medium storing the software redundancy establishing program, and a method thereof, capable of seamlessly and appropriately ensuring safety of a system while effectively utilizing resources.

According to one aspect of the present disclosure, an electronic control unit comprises a first storage section in which software is deployable, a second storage section in which software is deployable, and a controller configured to set one of the first storage section and the second storage section as an active area, and set another one of the first storage section and the second storage section as an inactive area. The controller rewrites the software in the inactive area into the software identical to the software in the active area in a case where a predetermined condition is satisfied.

In a case where the predetermined condition is satisfied, the software in the inactive area is rewritten into software identical to the software in the active area. By switching the first storage section and the second storage section between the active area and the inactive area, resources can be effectively utilized, unlike the conventional case in which a storage area is prepared for software of a limited use. For example, after the software in the inactive area has been rewritten and the active area and the inactive area have been switched, which corresponds to an example of the case where the predetermined condition is satisfied, software in the inactive area is rewritten into software identical to software in the active area. With this processing, redundancy can be caused to be established seamlessly between the software in the active area and the software in the inactive area, and the safety of the system can be seamlessly and appropriately ensured, unlike the conventional case in which a backup is performed to prepare merely for when the software in the main processing unit is rewritten. As a result, the safety of the system can be seamlessly and appropriately ensured while resources are effectively utilized.

Figure 1:
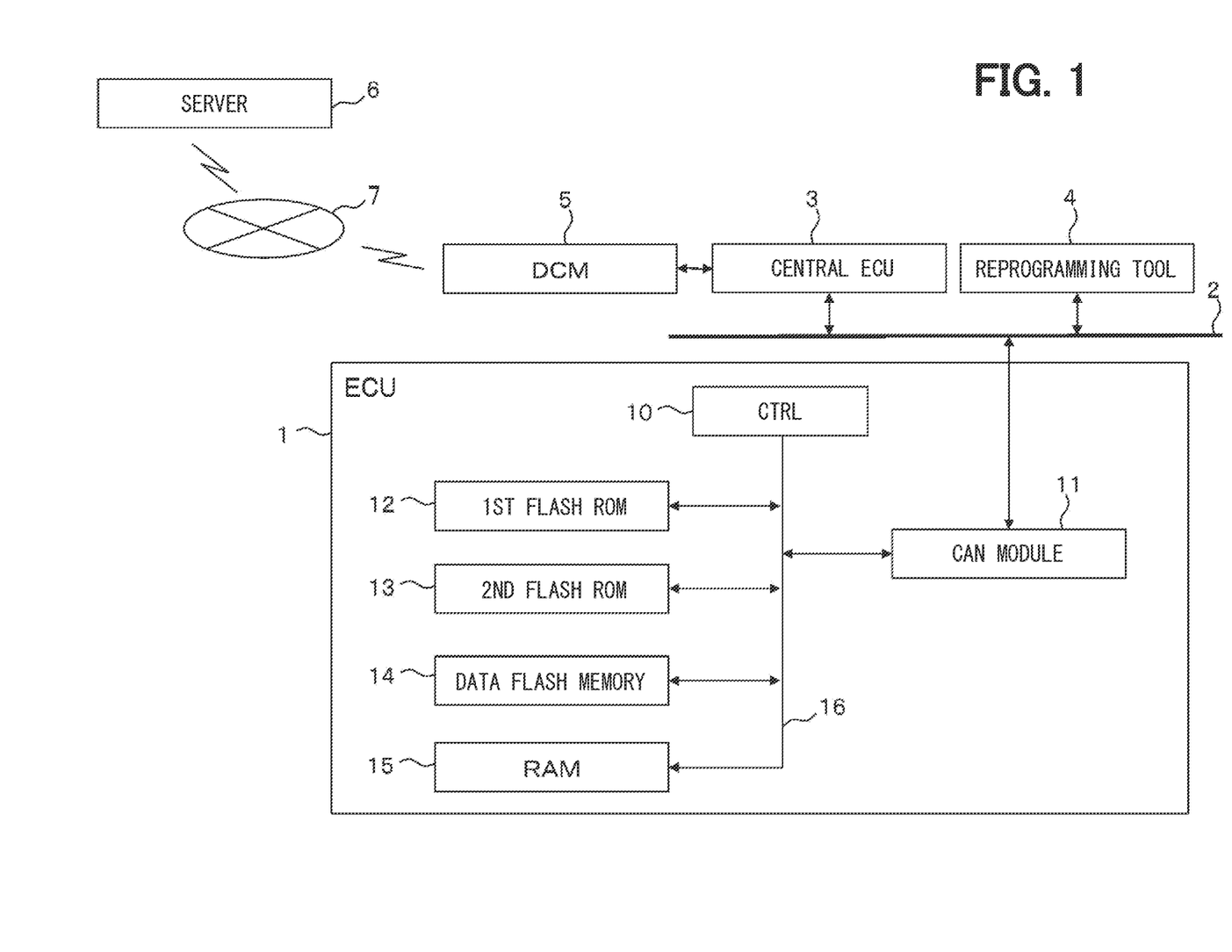
FIG. 1 is a functional block diagram illustrating an overall configuration of an embodiment.

An embodiment will be described with reference to the drawings. As illustrated in FIG. 1, an ECU 1 is an ECU mounted in a vehicle, and is connected to an in-vehicle network 2. The ECU may be an in-vehicle ECU or a general-purpose ECU. The in-vehicle network 2 is a Controller Area Network (CAN) (registered trademark). The in-vehicle network 2 may be FLEXRAY (registered trademark), a Clock Extension Peripheral Interface (CXPI) (registered trademark), Ethernet (registered trademark), or the like. In the present embodiment, a configuration is exemplified in which a single ECU is connected to the in-vehicle network 2. However, no limitation is imposed on the number of ECUs connected to the in-vehicle network 2. Also, no limitation is imposed on the number of in-vehicle networks 2. The ECU 1 is, for example, a unit that controls a driving system, a unit that controls an advanced driving assistant system (ADAS), a unit that controls a multimedia system, or the like. The ECU 1 can be a target in which software is rewritten along with update, functional improvement, or the like of the software. The software includes a so-called program providing instruction on a procedure of processing for causing a computer to execute an operation, and further includes a file, data, a library, and the like referred to in executing the program. The program includes one or more instructions as a computer program code.

A central ECU 3 is a unit that functions as an over-the-air (OTA) master, and is connected to a data communication module (DCM) 5 that functions as a data communication unit. The DCM 5 can receive a distribution package transmitted from a server 6 functioning as an OTA center by wirelessly connecting to the server 6 via a communication network 7. When the DCM 5 receives the distribution package transmitted from the server 6, the DCM 5 transfers the received distribution package to the central ECU 3. When the distribution package is transferred from the DCM 5, the central ECU 3 extracts rewriting data from the transferred distribution package. Then, the central ECU 3 transmits the extracted rewriting data to the rewriting target ECU 1, while the central ECU 3 transmits a rewriting instruction to the rewriting target ECU 1, to cause the rewriting target ECU 1 to rewrite software. That is, the rewriting target ECU 1 receives the rewriting data from the central ECU 3, while the rewriting target ECU 1 receives the rewriting instruction from the central ECU 3. Then, the rewriting target ECU 1 rewrites the software by writing the rewriting data in a storage area. A mode in which rewriting data received from the server 6 via the communication network 7 is written in the rewriting target ECU 1 is referred to as a so-called wireless reprogramming. When a distribution package is transferred from the DCM 5, the central ECU 3 may transmit the transferred distribution package to the rewriting target ECU 1. Alternatively, when the DCM 5 receives a distribution package transmitted from the server 6, the DCM 5 may extract rewriting data from the received distribution package, and may transfer the extracted rewriting data to the central ECU 3.

In a state where a reprogramming tool 4 is connected to the in-vehicle network 2, the reprogramming tool 4 transmits rewriting data to the rewriting target ECU 1, while the reprogramming tool 4 transmits a rewriting instruction to the rewriting target ECU 1. Then, the reprogramming tool 4 causes the rewriting target ECU 1 to rewrite software. That is, the rewriting target ECU 1 receives the rewriting data from the reprogramming tool 4, while the rewriting target ECU 1 receives the rewriting instruction from the reprogramming tool 4. Then, the rewriting target ECU 1 rewrites the software by writing the rewriting data in a storage area. A mode in which rewriting data received from the reprogramming tool 4 without via the communication network 7 is written in the rewriting target ECU 1 is referred to as a so-called wired reprogramming. Although the present embodiment exemplifies the configuration in which the reprogramming tool 4 is directly connected to the in-vehicle network 2, the reprogramming tool 4 may be connected to the in-vehicle network 2 via the central ECU 3.

The ECU 1 includes a controller 10 mainly including a CPU, a CAN module 11, a first flash ROM 12 (corresponding to a first storage section), a second flash ROM 13 (corresponding to a second storage section), a data flash memory 14, and a RAM 15, which are interconnected via an internal bus 16. Each of the first flash ROM 12 and the second flash ROM 13 may be referred to as a code flash memory. The first flash ROM 12 and the second flash ROM 13 are different from the data flash memory 14 in electrical characteristics such as a memory size, the number of rewritings, and a bus cycle. Each of the first flash ROM 12 and the second flash ROM 13 stores a program. The data flash memory 14 stores user custom information.

As will be described in detail later, when a redundant state is enabled, the software stored in the first flash ROM 12 and the software stored in the second flash ROM 13 are identical to each other, and the controller 10 mainly including the CPU executes either the software stored in the first flash ROM 12 or the software stored in the second flash ROM 13.

The first flash ROM 12 and the second flash ROM 13 are configured as, for example, a dual-bank flash ROM. In this case, physically, a single ROM is set such that a memory area thereof includes two banks, and one of the banks is configured as the first flash ROM 12 and the other bank is configured as the second flash ROM 13. Alternatively, the first flash ROM 12 and the second flash ROM 13 may be physically separate ROMs.

The controller 10 executes a computer program stored in a non-transitory tangible storage medium to execute processing corresponding to the computer program, and controls the operation of the ECU 1. The CAN module 11 controls input and output of a CAN signal to and from the in-vehicle network 2. The first flash ROM 12 and the second flash ROM 13 are storage areas to which independent address spaces are allocated, and can store software. The software stored in the first flash ROM 12 and the second flash ROM 13 may be software related to a traveling control system, involved in traveling control of a vehicle, or may be software not related to the traveling control system, not involved in traveling control of a vehicle.

Figure 2:
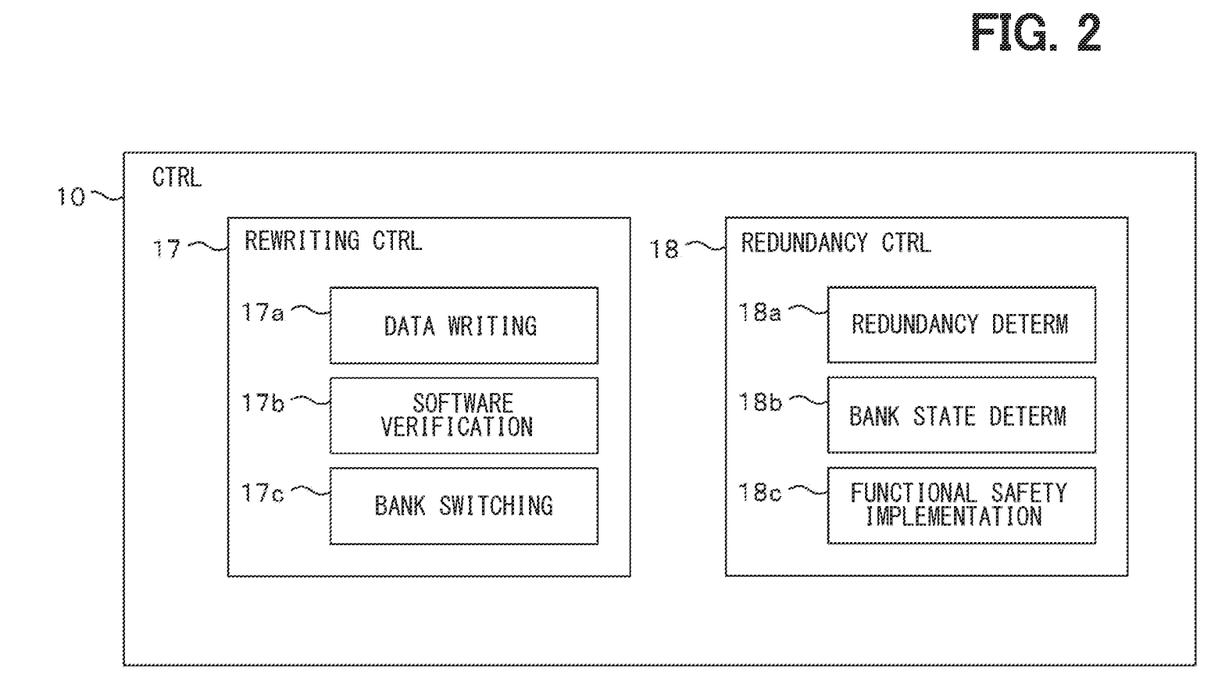
FIG. 2 is a functional block diagram of a controller.

As illustrated in FIG. 2, the controller 10 includes a rewriting control section 17 provided as a function that controls rewriting of software, and a redundancy control section 18 provided as a function that controls redundancy of software. The rewriting control section 17 includes a data writing section 17a that writes rewriting data, a software verification section 17b that verifies software, deployed by writing the rewriting data, using a MAC or a hash value, and a bank switching section 17c that controls switching between an active bank (corresponding to an active area) and an inactive bank (corresponding to an inactive area).

The controller 10 can set one of the first flash ROM 12 and the second flash ROM 13 as the active bank, and the other one as the inactive bank. Then, the controller 10 can rewrite software in the inactive bank by using the data writing section 17a during execution of software in the active bank. Upon receiving rewriting data and a rewriting instruction from the central ECU 3 or the reprogramming tool 4, the controller 10 starts to rewrite software by causing the data writing section 17a to start to write the rewriting data to the inactive bank.

When the writing of the rewriting data to the inactive bank is completed and the rewriting of the software is completed, the controller 10 verifies the deployed software by using the software verification section 17b. In a case where the verification result brought by the software verification section 17b is normal, and additionally, in a case where a bank switching condition is satisfied, the controller 10 switches between the active bank and the inactive bank by using the bank switching section 17c. For example, in a case where the software related to the traveling control system is rewritten while a vehicle is traveling, there is a concern about the influence of the bank switching on the traveling of the vehicle. In this case, the controller 10 thus waits for the vehicle to complete transition from the traveling state to a parking state, without switching between the active bank and the inactive bank, even when the rewriting is completed for the software related to the traveling control system. Then, after the transition is made to the parking state, the controller 10 switches between the active bank and the inactive bank. For example, in a case where the software not related to the traveling control system is rewritten while a vehicle is traveling, there is no concern about the influence of the bank switching on the traveling of the vehicle. In this case, the controller 10 thus switches between the active bank and the inactive bank, without waiting for the vehicle to complete the transition from the traveling state to the parking state, when the rewriting is completed for the software not related to the traveling control system. Even in the case of the rewriting of the software not related to the traveling control system, the controller 10 may wait for a vehicle to complete the transition from the traveling state to the parking state, and then may switch between the active bank and the inactive bank after the transition to the parking state. In the case of an engine vehicle, the traveling state of the vehicle means, for example, an ignition-on state, and the parking state of the vehicle means, for example, an ignition-off state. In the case of an electric vehicle (EV), the traveling state of the vehicle means, for example, an EV-system-on state, and the parking state of the vehicle means, for example, an EV-system-off state.

The redundancy control section 18 includes a redundancy determination section 18a that determines whether a condition encouraging establishment of redundancy is satisfied, a bank state determination section 18b that determines states of the active bank and the inactive bank, and a functional safety implementation section 18c that executes implementation of functional safety. Each of the sections 18a to 18c executes a software redundancy establishing program.

The redundancy determination section 18a causes software in the inactive bank to be rewritten into software identical to software in the active bank, in a case where a condition due to an external factor or a condition encouraging establishment of redundancy due to an internal factor is satisfied, after software in the previously inactive bank has been rewritten and the previously active bank and the previously inactive bank have been switched (this set of actions corresponds to a case where a predetermined condition is satisfied). In this case, the condition due to an external factor corresponds to the fact that input has been detected as to a redundancy establishing instruction from the central ECU 3 or the reprogramming tool 4. The condition due to an internal factor corresponds to the fact that an error inside the ECU 1 has been detected, the fact that a security threat has been detected, the fact that a jump level of an update to a rewriting target with new software is equal to or greater than a predetermined value, the fact that a predetermined time has elapsed since the previous software rewriting, the fact that an abnormality has been detected in the active bank, or the like.

Here, the jump level of an update with new software will be described. The jump level of an update can be determined by, for example, information on a version of software or information on an update delivered from the server 6. For example, in the case of a major update such as an update from version 1.0 to version 2.0, determination is made that the jump level of the update is equal to or greater than a predetermined value. In contrast, in the case of a minor update such as an update from version 1.0 to version 1.1, determination is made that the jump level of the update is smaller than a predetermined value. The fact that the jump level of an update is equal to or greater than a predetermined value may be indicated through the information on an update delivered from the server 6.

The software in the active bank and the software in the inactive bank will be described. Both the software in the inactive bank and the software in the active bank are deployed in an executable state, and even the software in the inactive bank is not compressed. When the condition encouraging establishment of redundancy is determined to be satisfied, the rewriting control section 17 rewrites software in the inactive bank into software identical to software in the active bank. The rewriting control section 17 may address an address area for storing software in the active bank, which is a target for which redundancy is established, to copy the software to an address area in the inactive bank, or may specify a file name to copy the software to the inactive bank.

In a case where a failure is identified in the active bank or in the inactive bank after redundancy has been established between software in the active bank and software in the inactive bank, and in a case where the condition due to an external factor or the condition encouraging establishment of redundancy due to an internal factor is satisfied, the redundancy determination section 18a causes the software in the inactive bank to be rewritten into software identical to the software in the active bank, thereby causing the failure to be repaired. In this case, the condition due to an external factor corresponds to the fact that input has been detected as to the redundancy establishing instruction from the central ECU 3 or the reprogramming tool 4. The conditions due to an internal factor corresponds to the fact that an error inside the ECU 1 has been detected, the fact that a security threat has been detected, the fact that an abnormality has been detected in the active bank or in the inactive bank, or the like. The redundancy establishing instruction from the central ECU 3 or the reprogramming tool 4 is an example of a restoration instruction.

The ECU 1 has various functions such as a function of monitoring a communication state of the in-vehicle network 2, a function of monitoring operation states of the flash ROMs 12, 13, and a function of verifying data of the flash ROMs 12, 13. The program on each of the flash ROMs 12, 13 has functions of monitoring abnormalities in a program operation that are hardly assumable in a normal state, such as a case in which an invalid argument is input, and a case in which a stack is broken. When abnormalities or failures are detected, these monitoring functions create detection reports. The redundancy determination section 18a determines whether the detection report has been created, or whether the condition due to an internal factor has been satisfied on the basis of the content of the created detection report.

Next, the operation of the above configuration will be described with reference to FIGS. 2 to 7. The controller 10 executes redundancy determination processing, on-startup determination processing, and software execution processing. Hereinafter, each processing will be sequentially described.

Figure 3:
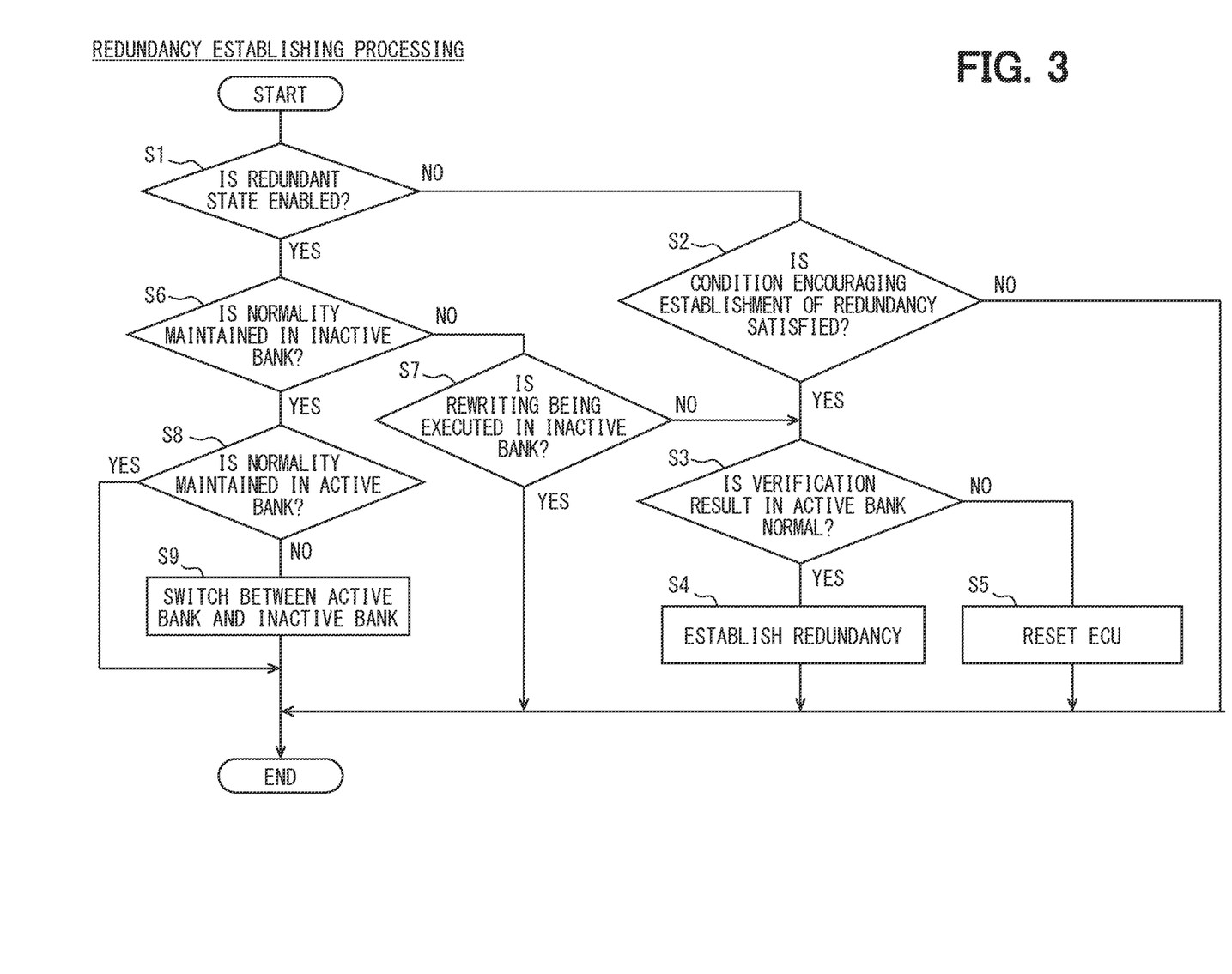
FIG. 3 is a flowchart illustrating redundancy determination processing.

(1) Redundancy Establishing Processing (see FIG. 3)

The controller 10 repeatedly executes the redundancy establishing processing while the vehicle is in the ignition-on state. When the controller 10 starts the redundancy establishing processing, the controller 10 acquires and compares software information in the active bank and software information in the inactive bank, and determines whether the redundant state between the active bank and the inactive bank is enabled (S1). The software information is, for example, information that can identify software, such as information on a version of the software or an ID of the software.

In a case where the controller 10 determines that software in the active bank and software in the inactive bank are different from each other and thus the redundant state between the active bank and the inactive bank is not enabled (S1: NO), the controller 10 determines whether the condition encouraging establishment of redundancy is satisfied (S2). That is, as the condition due to an external factor, the controller 10 determines whether input has been detected as to the redundancy establishing instruction from the central ECU 3 or the reprogramming tool 4. As the conditions due to internal factors, the controller 10 determines whether an error inside the ECU 1 has been detected, whether a security threat has been detected, whether a jump level of an update to a rewriting target with new software has been detected to be equal to or greater than a predetermined value, whether detection has been made as to elapse of a predetermined time since the previous software rewriting, whether an abnormality has been detected in the active bank, and the like. In a case where the controller 10 determines that all of these conditions are not satisfied and thus the condition encouraging establishment of redundancy is not satisfied (S2: NO), the controller 10 terminates the redundancy establishing processing.

On the other hand, in a case where the controller 10 determines that any one of these conditions is satisfied and thus the condition encouraging establishment of redundancy is satisfied (S2: YES), the controller 10 verifies the software in the active bank, and makes determination as to the verification result (S3). In a case where the controller 10 determines that the verification result of the software in the active bank is normal (S3: YES), the controller 10 rewrites the software in the inactive bank into software identical to the software in the active bank and thus establishes redundancy between the software in the active bank and the software in the inactive bank (S4), and terminates the redundancy establishing processing. In a case where the controller 10 determines that the verification result of the software in the active bank is abnormal (S3: NO), the controller 10 resets the ECU 1 (S5), and terminates the redundancy establishing processing. The flow of the processing in steps S1: NO, S2: YES, S3: YES, and S4 described above corresponds to a rewriting procedure. The configuration has been exemplified above in which the controller 10 determines that the condition encouraging establishment of redundancy is satisfied in a case where any one of the conditions described above is satisfied. However, the controller 10 may determine that the condition encouraging establishment of redundancy is satisfied in a case where all of the conditions are satisfied, or may determine that the condition encouraging establishment of redundancy is satisfied in a case where a predetermined number of conditions set in advance are satisfied.

In a case where the controller 10 determines that the software in the active bank and the software in the inactive bank are identical to each other and thus the redundant state between the active bank and the inactive bank is enabled (S1: YES), the controller 10 determines whether normality is maintained in the inactive bank (S6). In a case where the controller 10 determines that normality is not maintained in the inactive bank (S6: NO), the controller 10 determines whether rewriting is being executed in the inactive bank (S7). In a case where the controller 10 determines that rewriting is being executed in the inactive bank (S7: YES), the controller 10 terminates the redundancy establishing processing.

On the other hand, in a case where the controller 10 determines that rewriting is not being executed in the inactive bank (S7: NO), the controller 10 verifies the software in the active bank and makes determination as to the verification result also in this case (S3). In a case where the controller 10 determines that the verification result of the software in the active bank is normal (S3: YES), the controller 10 rewrites the software in the inactive bank into software identical to the software in the active bank and thus establishes redundancy between the software in the active bank and the software in the inactive bank (S4), and terminates the redundancy establishing processing. In a case where the controller 10 determines that the verification result of the software in the active bank is abnormal (S3: NO), the controller 10 resets the ECU 1 (S5), and terminates the redundancy establishing processing. The flow of the processing in steps S1: YES, S6: NO, S7: NO, S3: YES, and S4 described above corresponds to a restoration procedure.

In a case where the controller 10 determines that normality is maintained in the inactive bank (S6: YES), the controller 10 determines whether normality is maintained in the active bank (S8). In a case where the controller 10 determines that normality is maintained in the active bank (S8: YES), the controller 10 terminates the redundancy establishing processing. On the other hand, in a case where the controller 10 determines that normality is not maintained in the active bank (S8: NO), the controller 10 switches between the active bank and the inactive bank (S9), and terminates the redundancy establishing processing.

Figure 4:
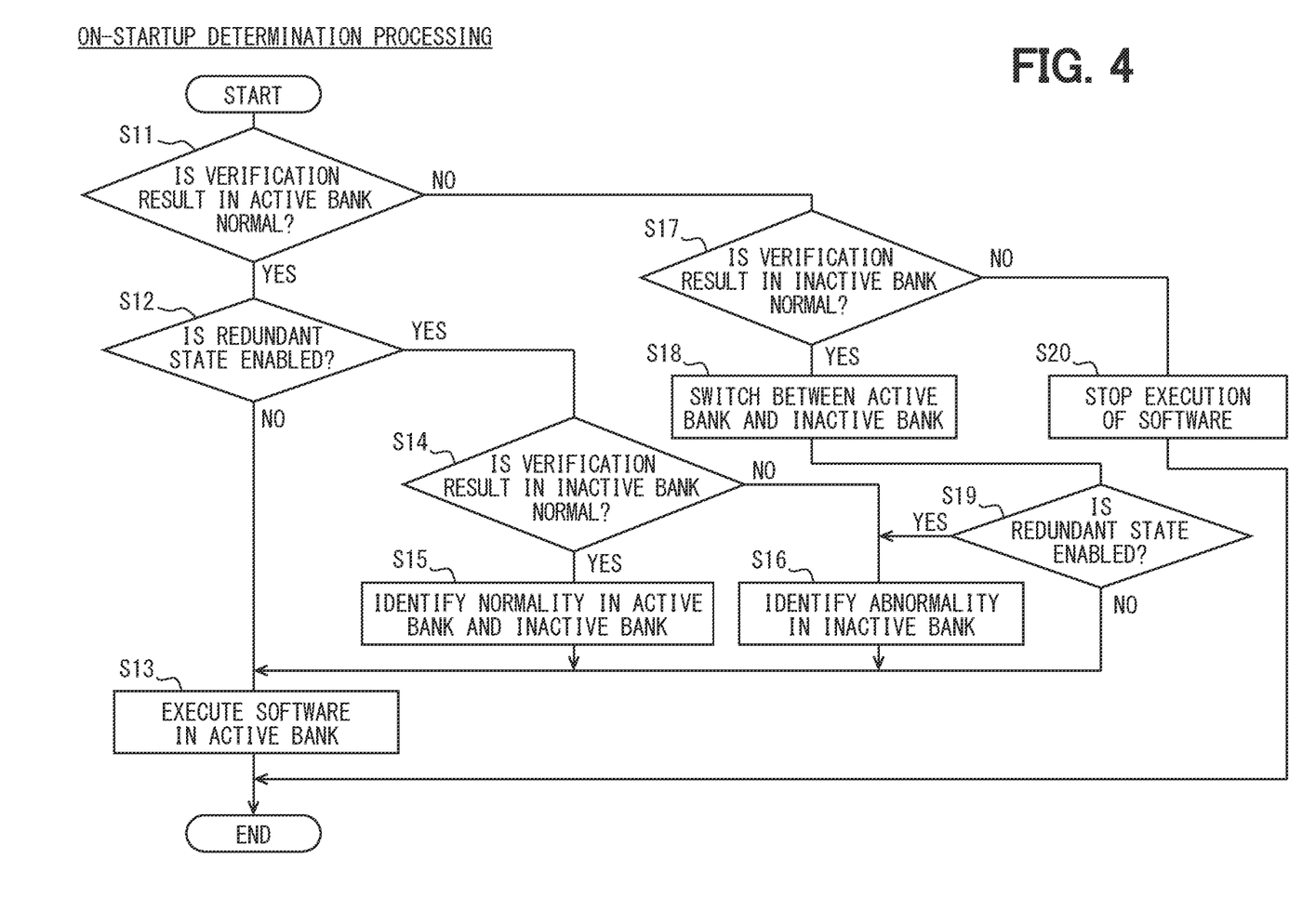
FIG. 4 is a flowchart illustrating on-startup determination processing.

(2) On-Startup Determination Processing (See FIG. 4)

When the controller 10 starts the on-startup determination processing, the controller 10 verifies software in the active bank, and makes determination as to the verification result (S11). In a case where the controller 10 determines that the verification result of the software in the active bank is normal (S11: YES), the controller 10 determines whether the redundant state between the active bank and the inactive bank is enabled (S12). In a case where the controller 10 determines that the redundant state between the active bank and the inactive bank is not enabled (S12: NO), the controller 10 executes the software in the active bank (S13), and terminates the on-startup determination processing.

In a case where the controller 10 determines that the redundant state between the active bank and the inactive bank is enabled (S12: YES), the controller 10 verifies software in the inactive bank, and makes determination as to the verification result (S14). In a case where the controller 10 determines that the verification result of the software in the inactive bank is normal (S14: YES), the controller 10 identifies the fact that normality is maintained in both the active bank and the inactive bank (S15), then executes the software in the active bank (S13), and terminates the on-startup determination processing. In a case where the controller 10 determines that the verification result of the software in the inactive bank is abnormal (S14: NO), the controller 10 identifies the fact that an abnormality occurs in the inactive bank while normality is maintained in the active bank (S16), then executes the software in the active bank (S13), and terminates the on-startup determination processing.

On the other hand, in a case where the controller 10 determines that the verification result of the software in the active bank is abnormal (S11: NO), the controller 10 verifies the software in the inactive bank, and makes determination as to the verification result (S17). In a case where the controller 10 determines that the verification result of the software in the inactive bank is normal (S17: YES), the controller 10 switches between the active bank and the inactive bank (S18), and determines whether the redundant state between the active bank and the inactive bank is enabled (S19). In this case, identical software is stored in the active bank and in the inactive bank, and thus normal software can be immediately started simply by switching between the active bank and the inactive bank.

In a case where the controller 10 determines that the redundant state between the active bank and the inactive bank is enabled (S19: YES), the controller 10 identifies the fact that an abnormality occurs in the inactive bank while normality is maintained in the active bank also in this case (S16), then executes software in the active bank (S13), and terminates the on-startup determination processing. In a case where the controller 10 determines that the redundant state between the active bank and the inactive bank is not enabled (S19: NO), the controller 10 executes the software in the active bank (S13), and terminates the on-startup determination processing. In a case where the controller 10 determines that the verification result of the software in the inactive bank is abnormal (S17: NO), the controller 10 stops the execution of the software (S20), and terminates the on-startup determination processing.

Figure 5:
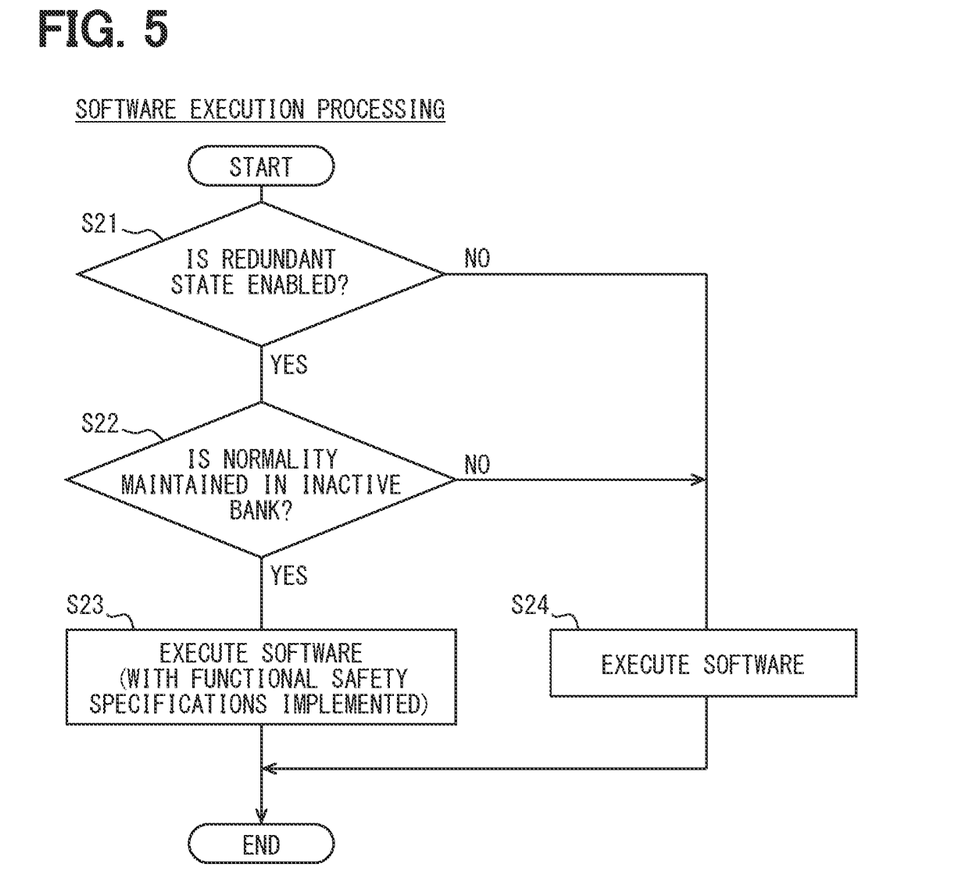
FIG. 5 is a flowchart illustrating software execution processing.

(3) Software Execution Processing (See FIG. 5)

When the controller 10 starts the software execution processing, the controller 10 determines whether the redundant state between the active bank and the inactive bank is enabled (S21). In a case where the controller 10 determines that the redundant state between the active bank and the inactive bank is enabled (S21: YES), the controller 10 determines whether normality is maintained in the inactive bank (S22). In a case where the controller 10 determines that normality is maintained in the inactive bank (S22: YES), the controller 10 executes software (S23), and terminates the software execution processing. In this case, the controller 10 executes the software while the redundant state between the active bank and the inactive bank is enabled and normality is maintained in the inactive bank, thereby confirming that the execution result of the software in the active bank matches the execution result of the software in the inactive bank. That is, the controller 10 executes the software in the active bank while executing the corresponding software in the inactive bank, compares the execution results, determines whether the execution results match each other, and when confirming the matching of the execution results, executes the software in the active bank. As a result, a program can be executed while an execution method of the program is caused to be a safer execution method of the program. That is, the software execution processing becomes processing in which functional safety specifications are implemented.

On the other hand, in a case where the controller 10 determines that the redundant state between the active bank and the inactive bank is not enabled (S21: NO), or in a case where the controller 10 determines that the redundant state between the active bank and the inactive bank is enabled (S21: YES) but determines that normality is not maintained in the inactive bank (S22: NO), the controller 10 executes the software in the active bank (S24), and terminates the software execution processing. In this case, the controller 10 executes the software while the redundant state between the active bank and the inactive bank is not enabled, or while the redundant state between the active bank and the inactive bank is enabled but normality is not maintained in the inactive bank, thereby executing the software in the active bank while no confirmation is made that the execution result of the software in the active bank matches the execution result of the software in the inactive bank, unlike the case described above in which confirmation is made that the execution results match each other.

Figure 6:
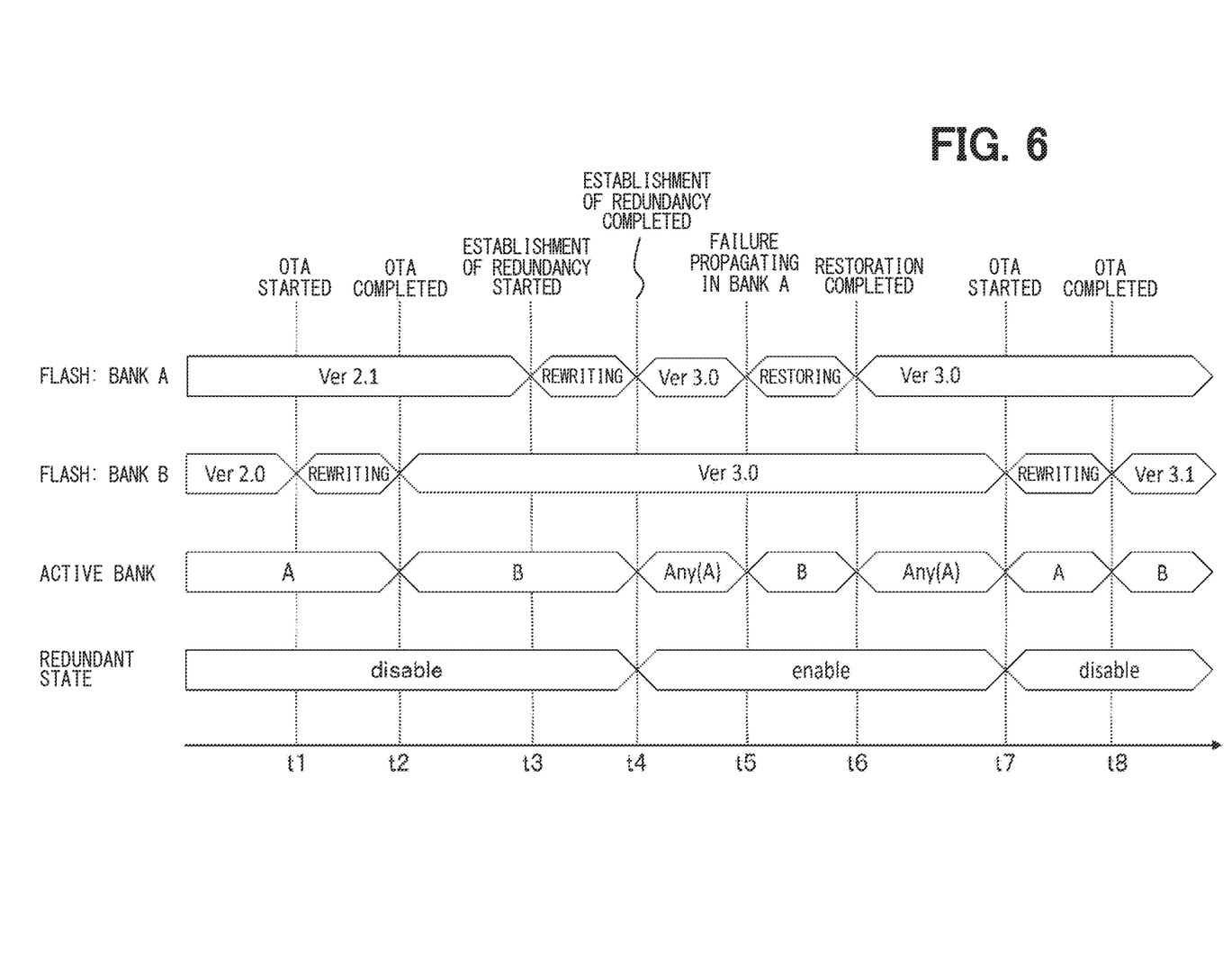
FIG. 6 is a timing chart.
Figure 7:
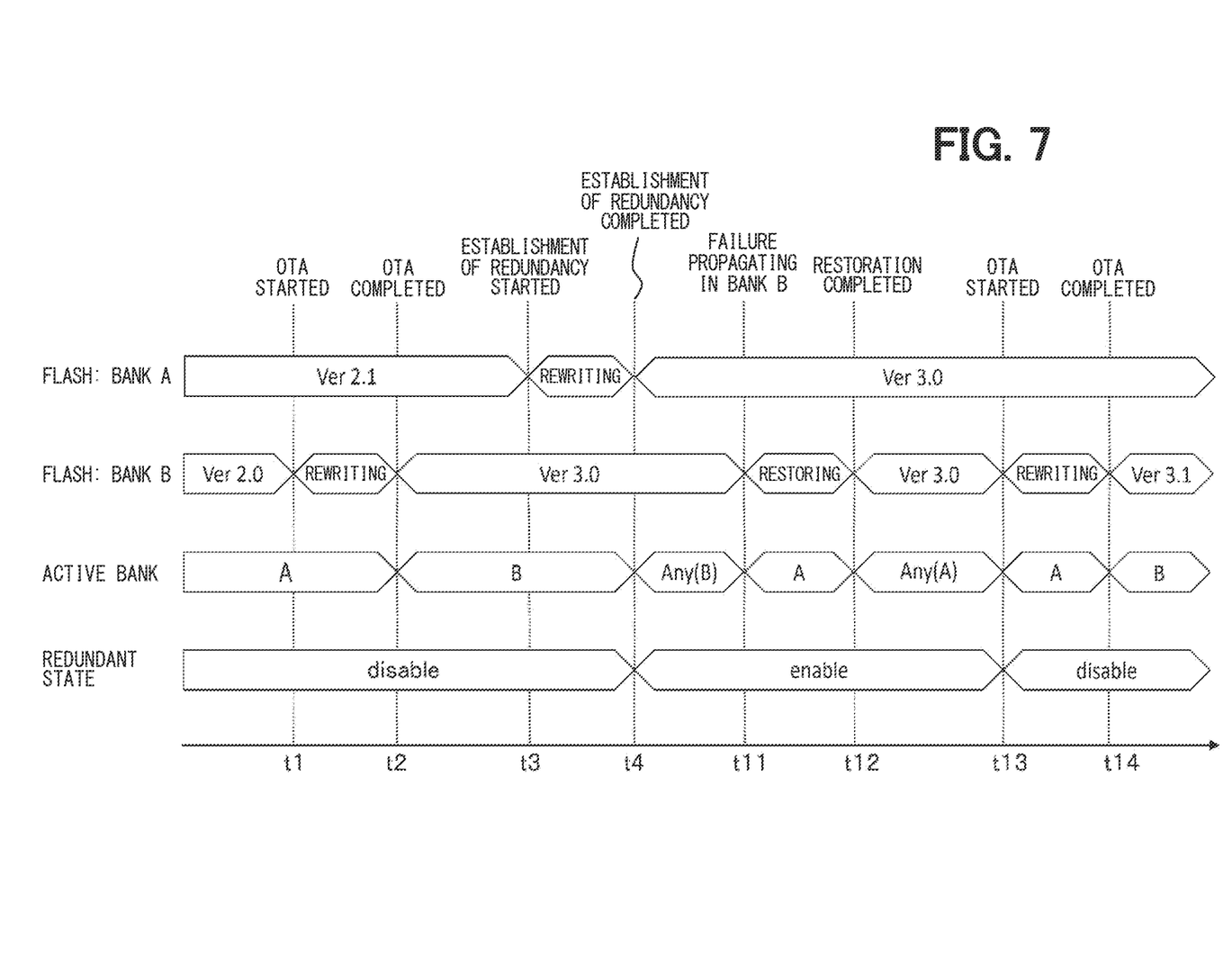
FIG. 7 is a timing chart.

Processing as to redundancy between software in the active bank and software in the inactive bank will be described with reference to FIGS. 6 and 7. In FIGS. 6 and 7, the first flash ROM 12 will be referred to as a bank A, and the second flash ROM 13 will be referred to as a bank B. FIGS. 6 and 7 each illustrate a case in which redundancy is caused to be established between the bank A and the bank B by the following processes. That is, first, the software of "Ver. 2.1" is deployed in the bank A while the software of "Ver. 2.0" is deployed in the bank B. Then, the software in the bank B is rewritten from "Ver. 2.0" to "Ver. 3.0". Subsequently, the software in the bank A is rewritten from "Ver. 2.1" to "Ver. 3.0". As a result, the redundancy described above is caused to be established. FIG. 6 illustrates a case in which a failure propagates in the bank A after redundancy is established between the bank A and the bank B. FIG. 7 illustrates a case in which a failure propagates in the bank B after redundancy is established between the bank A and the bank B. Hereinafter, each case will be sequentially described. FIGS. 6 and 7 each illustrate a case with wireless reprogramming, but a case with wired reprogramming is similarly applied to each of the cases in FIGS. 6 and 7.

(1) A Case in Which a Failure Propagates in the Bank A After Redundancy is Established Between the Bank A and the Bank B When the controller 10 detects a rewriting request for rewriting the software in the bank B from "Ver. 2.0" to "Ver. 3.0" in a state where the active bank is set to the bank A while the inactive bank is set to the bank B, the controller 10 starts to rewrite the software in the bank B from "Ver. 2.0" to "Ver. 3.0" (t1). When the controller 10 completes the rewriting (t2) and determines that a bank switching condition is satisfied, the controller 10 switches the active bank from the bank A to the bank B.

When the controller 10 determines that the condition encouraging establishment of redundancy is satisfied from this state, the controller 10 starts to rewrite the software in the bank A from "Ver. 2.1" to "Ver. 3.0" (t3). When the rewriting is completed (t4), the software of "Ver. 3.0" is deployed in both the bank A and the bank B, and thus the redundant state between the active bank and the inactive bank is enabled. At this time, the controller 10 may switch the active bank from the bank B to the bank A, or may maintain the bank B as the active bank without switching the active bank from the bank B to the bank A. In each of FIGS. 6 and 7, a state in which the active bank can be freely selected between the bank A and the bank B is represented as "Any". At this point, FIG. 6 illustrates a case in which the active bank is switched from the bank B to the bank A and the bank A is set as the active bank. A state in which the bank A is set as the active bank while the active bank can be freely selected between the bank A and the bank B is represented as "Any(A)". In contrast, a case in which the bank B is maintained as the active bank without switching the active bank from the bank B to the bank A fits into "Any(B)".

When the controller 10 identifies a failure in the bank A after redundancy is established between the bank A and the bank B, the controller 10 starts restoration of the bank A (t5). In this case, the controller 10 switches the active bank from the bank A to the bank B in a case where the active bank has been switched from the bank B to the bank A, or the controller 10 maintains the bank B as the active bank in a case where the bank B has been maintained as the active bank. When the restoration of the bank A is completed (t6), the software of "Ver. 3.0" is deployed in both the bank A and the bank B also in this case, and the redundant state between the active bank and the inactive bank is enabled again. Also at this time, the controller 10 may switch the active bank from the bank B to the bank A, or the controller 10 may maintain the bank B as the active bank without switching the active bank from the bank B to the bank A.

The bank to be rewritten may be specified in the rewriting instruction delivered from the server 6, or the bank written with an older version may be selected by allowing the controller 10 to acquire and compare the version of the software in the bank A and the version of the software in the bank B. When the redundant state is enabled, the inactive bank is rewritten with software of a newer version because the software of the identical version is written in the bank A and the bank B. Alternatively, the bank having a longer remaining lifetime may be selected from the bank A and the bank B by acquiring memory lifetime information.

When the controller 10 detects a rewriting request for rewriting the software in the bank B from "Ver. 3.0" to "Ver. 3.1", the controller 10 maintains the bank A as the active bank in a case where the active bank has been switched from the bank B to the bank A, or the controller 10 switches the active bank from the bank B to the bank A in a case where the bank B has been maintained as the active bank. Then, the controller 10 starts to rewrite the software in the bank B from "Ver. 3.0" to "Ver. 3.1" (t7). When the controller 10 completes the rewriting (t8) and determines that the bank switching condition is satisfied, the controller 10 switches the active bank from the bank A to the bank B.

(2) A Case in which a Failure Propagates in the Bank B after Redundancy is Established Between the Bank A and the Bank B The controller 10 executes processing similar to the processing described above, from t1 to t4. When the controller 10 identifies a failure in the bank B after redundancy is established between the bank A and the bank B (t11), the controller 10 starts restoration of the bank B. At this time, the controller 10 maintains the bank A as the active bank in a case where the active bank has been switched from the bank B to the bank A, or the controller 10 switches the active bank from the bank B to the bank A in a case where the bank B has been maintained as the active bank without switching the active bank from the bank B to the bank A. When the restoration of the bank B is completed (t12), the software of "Ver. 3.0" is deployed in both the bank A and the bank B also in this case, and the redundant state between the active bank and the inactive bank is enabled again. Also at this time, the controller 10 may switch the active bank from the bank A to the bank B, or may maintain the bank A as the active bank without switching the active bank from the bank A to the bank B.

When the controller 10 detects a rewriting request for rewriting the software in the bank B from "Ver. 3.0" to "Ver. 3.1", the controller 10 maintains the bank A as the active bank in a case where the active bank has been switched from the bank B to the bank A, or the controller 10 switches the active bank from the bank B to the bank A in a case where the bank B has been maintained as the active bank. Then, the controller 10 starts to rewrite the software in the bank B from "Ver. 3.0" to "Ver. 3.1" (t13). When the controller 10 completes the rewriting (t14) and determines that the bank switching condition is satisfied, the controller 10 switches the active bank from the bank A to the bank B.

As described above, according to the present embodiment, the following operation and effects can be obtained. In the electronic control unit 1, after software in the inactive bank has been rewritten and the active bank and the inactive bank have been switched, software in an inactive bank after being switched is rewritten into software identical to software in an active bank after being switched. By switching the first flash ROM 12 and the second flash ROM 13 between the active bank and the inactive bank, resources can be effectively utilized, unlike the conventional case in which a storage area is prepared for software of a limited use. After software in an inactive bank has been rewritten and an active bank and the inactive bank have been switched, software in an inactive bank after being switched is rewritten into software identical to software in an active bank after being switched. With this processing, redundancy can be caused to be established seamlessly between the software in the active bank and the software in the inactive bank, and the safety of the system can be seamlessly and appropriately ensured, unlike the conventional case in which a backup is performed to prepare merely for when the software in the main processing unit is rewritten. As a result, the safety of the system can be seamlessly and appropriately ensured while resources are effectively utilized.

On condition that an external factor is satisfied, that is, when input is detected as to the redundancy establishing instruction from the central ECU 3 or the reprogramming tool 4, software in the inactive bank is rewritten into software identical to software in the active bank. After software in the inactive bank has been rewritten and the active bank and the inactive bank have been switched, redundancy can be achieved on condition that the external factor is satisfied.

On condition that an internal factor is satisfied, that is, when an error inside the ECU 1 is detected, when a security threat is detected, when a jump level of an update to a rewriting target with new software is equal to or greater than a predetermined value, when a predetermined time has elapsed since the previous software rewriting, or when an abnormality is detected in the active bank, software in the inactive bank is rewritten into software identical to software in the active bank. After software in the inactive bank has been rewritten and the active bank and the inactive bank have been switched, redundancy can be achieved on condition that the internal factor is satisfied.

When an abnormality is identified in software in the active bank or software in the inactive bank after redundancy has been established between the software in the active bank and the software in the inactive bank, software in one side where the failure is identified is restored into software identical to software in the other side. Even if an abnormality occurs in software in the active bank or software in the inactive bank after redundancy has been established between the software in the active bank and the software in the inactive bank, the software in the one side where the failure is identified is restored into software identical to the software in the other side, whereby redundancy can be caused to be established seamlessly between the software in the active bank and the software in the inactive bank, and whereby the safety of the system can be seamlessly and appropriately ensured.

On condition that an external factor is satisfied, that is, when input is detected as to the redundancy establishing instruction from the central ECU 3 or the reprogramming tool 4, software in the one side where the failure is identified is restored into software identical to software in the other side. Even if an abnormality occurs in software in the active bank or software in the inactive bank after redundancy has been established between the software in the active bank and the software in the inactive bank, redundancy can be achieved on condition that the external factor is satisfied.

On condition that an internal factor is satisfied, that is, when an error inside the unit is detected, when a security threat is detected, or when an abnormality is detected in the active bank or in the inactive bank, software in the one side where the failure is identified is restored into software identical to software in the other side. Even if an abnormality occurs in software in the active bank or software in the inactive bank after redundancy has been established between the software in the active bank and the software in the inactive bank, redundancy can be achieved on condition that the internal factor is satisfied.

When a redundant state between the active bank and the inactive bank is determined to be enabled and normality is determined to be maintained in the inactive bank, software in the active bank is executed. By executing the software in the active bank while the redundant state between the active bank and the inactive bank is enabled, the software can be appropriately executed while ensuring functional safety.

In the present embodiment, the configuration has been exemplified in which the first flash ROM 12 and the second flash ROM 13 are storage areas to which independent address spaces are allocated. However, identical software is simply required to be written in the first storage section and the second storage section, and thus, for example, an identical address may be allocated to the first flash ROM 12 and the second flash ROM 13 while using a switching flag, to access the address of the first flash ROM 12 or the second flash ROM 13.

In the present embodiment, the first flash ROM 12 is referred to as the bank A and the second flash ROM 13 is referred to as the bank B. However, the first flash ROM 12 and the second flash ROM 13 may be small units referred to as pages or segments. In this case, the ECU 1 includes a plurality of first flash ROMs 12 and a plurality of second flash ROMs 13 respectively corresponding to the plurality of first flash ROMs 12. Alternatively, the first flash ROM 12 and the second flash ROM 13 may be configured as virtual storage.

Although the present disclosure has been described in accordance with the embodiment, it is to be understood that the present disclosure is not limited to the embodiment and structures. The present disclosure also includes various modifications and variations. Various combinations or forms, or other combinations or forms, in which only one element, one or more elements, or one or less elements are added to the various combinations or forms, are also within the scope and idea of the present disclosure.

The controller and the method thereof described in the present disclosure may be implemented by a dedicated computer provided by including a processor and a memory programmed to execute one or more functions embodied by a computer program. Alternatively, the controller and the method thereof described in the present disclosure may be implemented by a dedicated computer provided by including a processor with one or more dedicated hardware logic circuits. Alternatively, the controller and the method thereof described in the present disclosure may be implemented by one or more dedicated computers configured by a combination of a processor and a memory programmed to execute one or more functions, and a processor with one or more hardware logic circuits. The computer program may be stored in a non-transitory computer-readable storage medium, as an instruction to be executed by a computer.

What is claimed is:

1. An electronic control unit comprising:
    a first storage section in which software is deployable;
    a second storage section in which software is deployable; and
    a controller configured to set one of the first storage section and the second storage section as an active area, and set another one of the first storage section and the second storage section as an inactive area,
    wherein
    the controller rewrites the software in the inactive area into software identical to the software in the active area in a case where a predetermined condition is satisfied, and
    the controller executes the software in the active area in a case where the controller determines that a redundant state between the active area and the inactive area is enabled and determines that normality is maintained in the inactive area.

2. The electronic control unit according to claim 1, wherein
    after the controller has rewritten the software in the inactive area and has switched between the active area and the inactive area, which corresponds to the case where the predetermined condition is satisfied, the controller rewrites the software in the inactive area into the software identical to the software in the active area.

3. The electronic control unit according to claim 2, wherein
    the controller rewrites the software in the inactive area into the software identical to the software in the active area on condition that an external factor is satisfied.

4. The electronic control unit according to claim 3, wherein
    the controller identifies a fact that the external factor is satisfied, in a case where input has been detected as to a redundancy establishing instruction from a connection unit connected to the electronic control unit via a network.

5. The electronic control unit according to claim 2, wherein
    the controller rewrites the software in the inactive area into the software identical to the software in the active area on condition that an internal factor is satisfied.

6. The electronic control unit according to claim 5, wherein
    the controller identifies a fact that the internal factor is satisfied, based on at least one of:
    a case where an error inside the electronic control unit has been detected;
    a case where a security threat has been detected;

a case where a jump level of an update to a rewriting target with new software has been detected to be equal to or greater than a predetermined value;

a case where detection has been made as to elapse of a predetermined time since previous software rewriting; and a case where an abnormality has been detected in the active area.

7. The electronic control unit according to claim 1, wherein in a case where the controller identifies a failure in the active area or in the inactive area after redundancy has been established between the software in the active area and the software in the inactive area, the controller restores software in one side where the failure is identified into software identical to software in another side.

8. The electronic control unit according to claim 7, wherein the controller restores the software in the one side where the failure is identified into the software identical to the software in the other side on condition that an external factor is satisfied.

9. The electronic control unit according to claim 8, wherein the controller identifies a fact that the external factor is satisfied, in a case where input has been detected as to a restoration instruction from a connection unit connected to the electronic control unit via a network.

10. The electronic control unit according to claim 7, wherein the controller restores the software in the inactive area into the software identical to the software in the active area on condition that an internal factor is satisfied.

11. The electronic control unit according to claim 10, wherein the controller identifies a fact that the internal factor is satisfied, based on at least one of:

a case where an error inside the electronic control unit has been detected;

a case where a security threat has been detected; and a case where an abnormality has been detected in the active area or in the inactive area.

12. A non-transitory computer-readable storage medium storing a software redundancy establishing program configured to cause a controller included in an electronic control unit to execute a rewriting procedure in which software in an inactive area is rewritten into software identical to software in an active area in a case where a predetermined condition is satisfied, the electronic control unit including:

a first storage section in which software is deployable;

a second storage section in which software is deployable; and the controller configured to set one of the first storage section and the second storage section as the active area, and set another one of the first storage section and the second storage section as the inactive area, wherein the controller executes the software in the active area in a case where the controller determines that a redundant state between the active area and the inactive area is enabled and determines that normality is maintained in the inactive area.

13. The non-transitory computer-readable storage medium storing the software redundancy establishing program according to claim 12, wherein in a case where a failure is identified in the active area or in the inactive area after redundancy has been established between the software in the active area and the software in the inactive area, the program causes the controller to execute a restoration procedure in which software in one side where the failure is identified is restored into software identical to software in another side.

14. An electronic control unit comprising:

a first storage area storing software;

a second storage area storing software; and a controller including at least one processor and at least one memory storing computer program code, the controller configured to set one of the first storage area and the second storage area as an active area, and set another one of the first storage area and the second storage area as an inactive area, wherein the controller rewrites the software in the inactive area into software identical to the software in the active area in a case where a predetermined condition is satisfied, and the controller executes the software in the active area in a case where the controller determines that a redundant state between the active area and the inactive area is enabled and determines that normality is maintained in the inactive area.

* * * * *